S. MEEKER.
HOLDER FOR SURGICAL NEEDLES.
APPLICATION FILED JAN. 19, 1917.
1,261,586.
Patented Apr. 2, 1918.
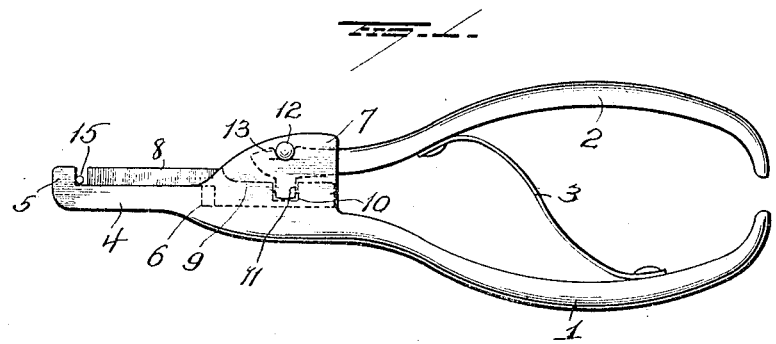
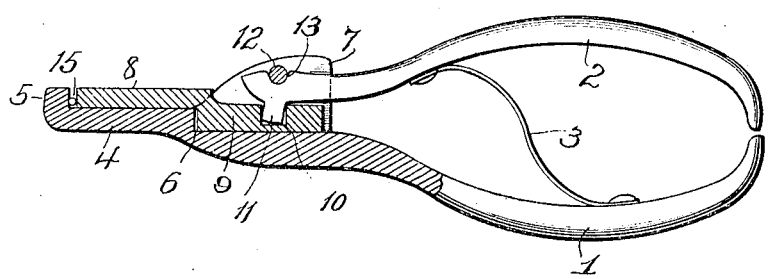
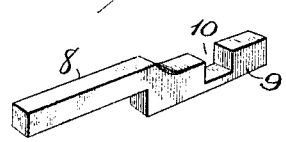
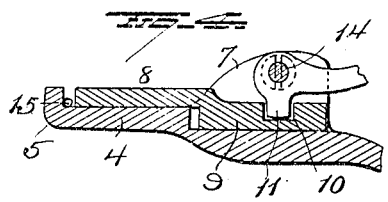
WITNESSES
H. P. Conley
W. A. Dodds
Sidney Meeker INVENTOR
By Seymour & Bright
Attorneys

UNITED STATES PATENT OFFICE.

SIDNEY MEEKER, OF MEMPHIS, TENNESSEE.

HOLDER FOR SURGICAL NEEDLES.

1,261,586.

Specification of Letters Patent.  Patented Apr. 2, 1918.

Application filed January 19, 1917. Serial No. 143,313.

*To all whom it may concern:*

Be it known that I, SIDNEY MEEKER, a citizen of the United States, and a resident of Memphis, in the county of Shelby and State of Tennessee, have invented certain new and useful Improvements in Holders for Surgical Needles; and I do hereby declare the following to be a full, clear, and exact description of the invention, such as will enable others skilled in the art to which it appertains to make and use the same.

This invention relates to improvements in holders for surgical needles,—one object of the invention being to so construct a device of this character that it may be readily taken apart and cleaned.

A further object is to provide a holder for surgical needles which shall be simple in construction; not liable to get out of order, and which shall operate to firmly grip the needle without liability of breaking the same.

With these and other objects in view the invention consists in certain novel features of construction and combinations of parts as hereinafter set forth and pointed out in the claim.

In the accompanying drawings, Figure 1 is an elevation of a holder embodying my improvements. Fig. 2 is a sectional view. Fig. 3 is a detail view showing the movable jaw, and Fig. 4 is a view illustrating a slight modification.

1, 2, represent the levers or handles of the device and a spring 3 tends normally to force the handles apart. The forward end of the handle or lever 1 is made with a straight bar 4 provided at its free end with an upturned lip 5 forming the fixed jaw of the device. Rearwardly of the bar 4, the lever 1 is recessed, as at 6, and at opposite sides of this recess, lugs 7 are provided. The movable jaw 8 of the holder is mounted to slide on the bar 4 and its rear portion is somewhat depressed, as at 9, and rests in the recessed portion of the lever between the lugs 7, 7. The rear portion 9 of the sliding jaw is provided with a socket or recess 10 to receive a toe 11 projecting from the handle or lever 2. A pin 12 passes transversely through the lugs 7, 7, and from one to the other to form a fulcrum for the handle or lever 2, for which purpose said handle or lever is provided diametrically opposite the toe 11 with a recess 13 in which said pin 12 is normally disposed. With such construction, it will be apparent that the parts of the device may be readily taken apart for cleaning and that they may be as easily re-assembled.

If desired, the co-acting faces of the jaws 5 and 8 may be roughened.

Instead of using a pin, such as indicated at 12, for the fulcrum of the handle or lever 2, I may employ a screw 14 as shown in Fig. 4.

With the use of my improved holder a needle (indicated at 15 Figs. 1 and 2) may be securely held between the jaws 5 and 8, regardless of the shape and size of the needle, and sufficient leverage will be provided to hold said needle immovably and resist all strain to which the needle may be subjected during the performance of a surgical operation.

Having fully described my invention what I claim as new and desire to secure by Letters-Patent, is:

A holder for surgical needles, comprising two levers, one of said levers having a bar extension provided at its free end with a fixed jaw and having two lugs in the rear of said bar extension, a pivot pin passing through said lugs and receiving the other lever, a movable jaw mounted to slide on said bar extension and guided in its movements by said lugs, said movable jaw having a recess in its rear portion and one of said levers having a toe projecting from the pivoted end of said lever and entering said recess.

In testimony whereof, I have signed this specification in the presence of two subscribing witnesses.

SIDNEY MEEKER, M. D.

Witnesses:
 HORACE P. CONLEY,
 W. O. BAIRD.

Copies of this patent may be obtained for five cents each, by addressing the "Commissioner of Patents, Washington, D. C."